Sept. 4, 1923. 1,467,176
LE ROY KRAMER ET AL
TOOL MOUNTING FOR LATHES
Original Filed Feb. 28, 1918 3 Sheets-Sheet 2
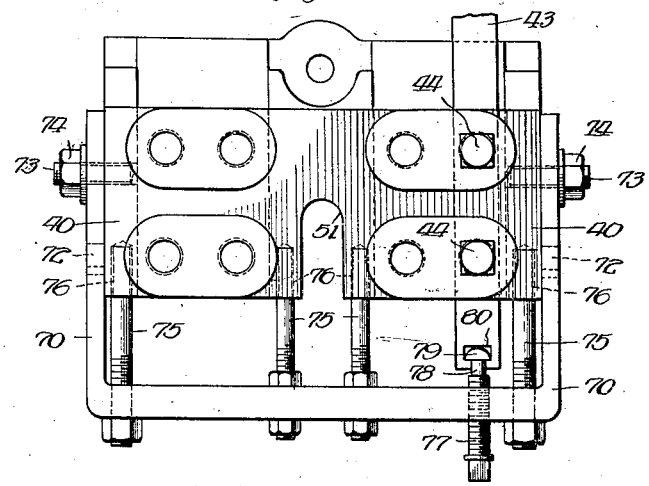
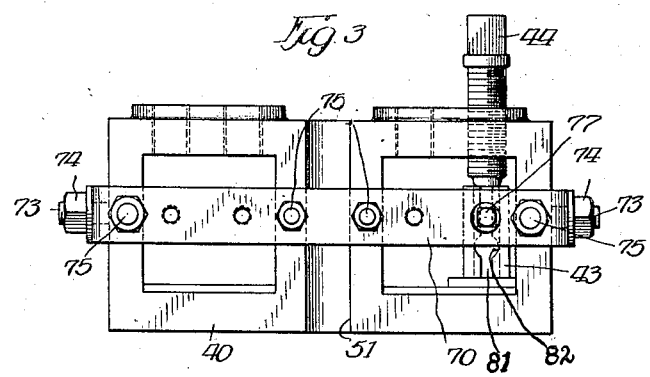
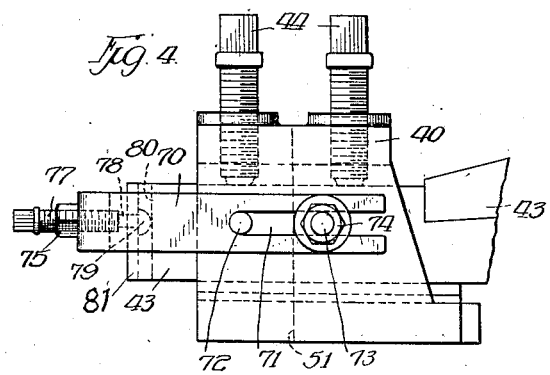

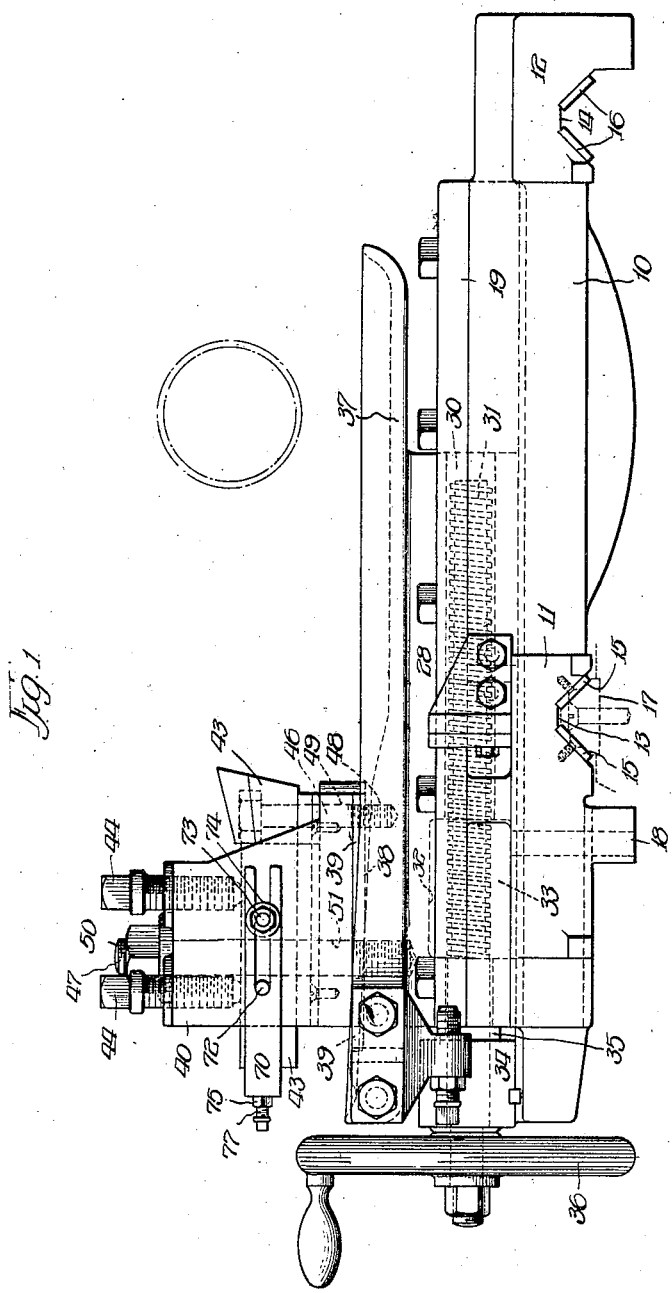

Sept. 4, 1923.
LE ROY KRAMER ET AL
TOOL MOUNTING FOR LATHES
Original Filed Feb. 28, 1918
1,467,176
3 Sheets-Sheet 3
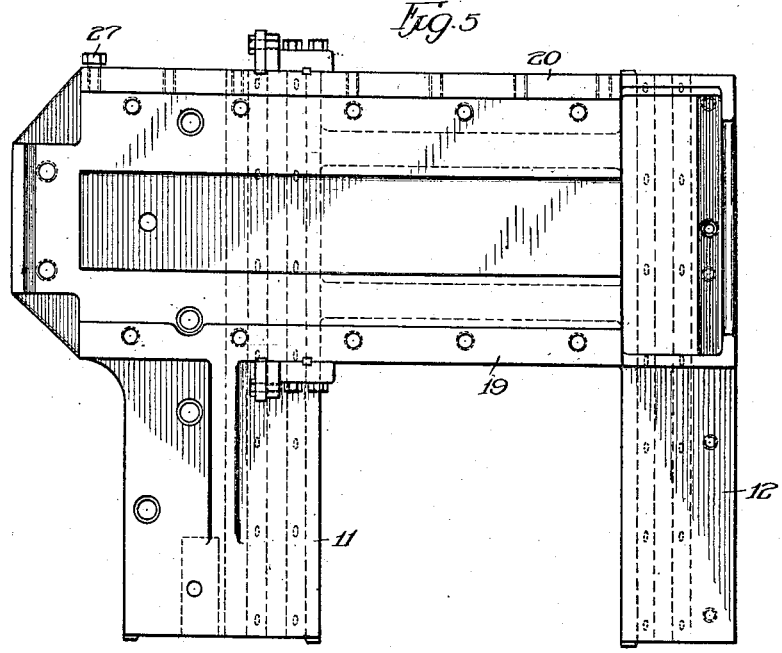
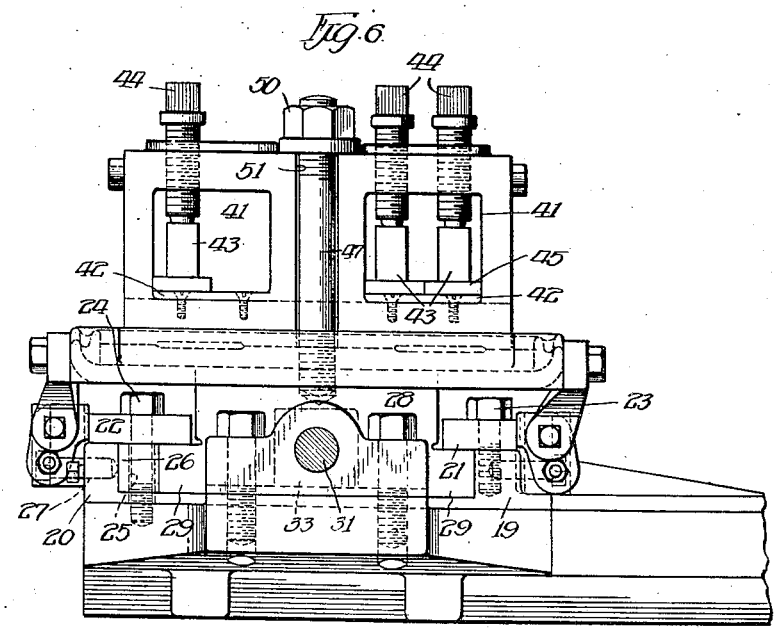
Witness:
R. Burkhardt
Inventors
LeRoy Kramer and
Alexander Boorne
By Cromwell, Greist & Warden
attys.

Patented Sept. 4, 1923.

1,467,176

UNITED STATES PATENT OFFICE.

LE ROY KRAMER, OF TOLEDO, OHIO, AND ALEXANDER BOOME, OF CHICAGO, ILLINOIS.

TOOL MOUNTING FOR LATHES.

Original application filed February 28, 1918, Serial No. 219,551. Divided and this application filed May 5, 1920. Serial No. 378,982.

*To all whom it may concern:*

Be it known that we, LE ROY KRAMER and ALEXANDER BOOME, citizens of the United States, residing, respectively, at Toledo, in the county of Lucas and State of Ohio, and at Chicago, in the county of Cook and State of Illinois, have invented certain new and useful Improvements in a Tool Mounting for Lathes, of which the following is a specification.

The present invention relates to tool mountings for lathes, and is particularly concerned with mountings on holders employed with lathes for turning car axles, this application being a division of our copending application Serial No. 219,551, Feb. 28, 1918, now Patent No. 1,394,628, dated Oct. 25, 1921.

The main and primary object of the invention is the provision of a tool holder which is adapted to receive a plurality of tools and properly support the same with such rigidity as to withstand the heavy pressure to which they are subjected during the operation of roughing the axles, thereby insuring stability to the holder and maintenance of the tools in their operative positions.

Another object is the provision of efficient and simple means by which the cutting tools are rigidly secured to the tool holder while at the same time permitting of their quick removal or adjustment.

With these general objects in view, and others which will appear as the nature of the improvements is better understood, the invention consists substantially in the novel construction, combination and arrangement of parts hereinafter fully described, illustrated in the accompanying drawings, and finally pointed out in the appended claims. The embodiment of the invention which is delineated herein is to be taken only as an illustrative one, so that the invention is not to be understood as limited to such specific form.

In the drawings—

Fig. 1 is a side elevation of a tool holder constructed in accordance with the present invention, parts being slightly broken away;

Fig. 2 is a top plan view of the means for effecting horizontal adjustment of the tool;

Figs. 3 and 4 are end and side elevations, respectively, of the construction illustrated in Fig. 2;

Fig. 5 is a top plan view of the carriage; and

Fig. 6 is an end view of the tool block, cross-slide and carriage.

Referring now in detail to the accompany drawings, the numeral 10 designates the carriage of a metal turning lathe, which carriage partakes generally of the construction of carriages usually found in such machines. In order to adapt the same, however, to the peculiar needs which arise in connection with the turning of car axles it is necessary to impart to the carriage a high degree of rigidity and strength, thereby to afford proper stability to the carriage and support for the tools. To this end, the carriage 10 is provided with a pair of parallel laterally projecting webs 11 and 12, arranged, respectively, at the front and rear ends of the carriage 10, said webs being provided with guide grooves 13 and 14, respectively, the sides of which are arranged in divergent relation. Wear strips 15 and 16, respectively, are applied to the sides of said grooves 13 and 14, and by referring to Fig. 5 it will be observed that the guide grooves 13 and 14 extend throughout the entire width of the carriage 10 and receive slideways 17 carried by the bed of the machine and on which the wear strips 15 and 16 work. One of these slideways is illustrated in dotted lines in Fig. 1, it being unnecessary to illustrate further parts of the machine bed.

At the underside of the body 10 is a depending apron 18 for supporting the feed gears.

The upper side of the bed 10 is provided with longitudinally-extending marginal upwardly-directed flanges 19 and 20 to which are applied retaining strips 21 and 22, respectively, said strips 21 and 22 being of greater width than the width of the flanges 19 and 20, and thereby overhanging the inner edges of said flanges. This provides guides for the cross slide, to be hereinafter described, and thus insures proper movement of the slide as it traverses the carriage 10. The strip 21 is held in position on the flange 19 by a plurality of cap screws 23, which screws are threaded into said flange 19 while the strip 22 is likewise held in position on the flange 20 by a plurality of cap screws 24. These screws 24 take into the body of the carriage 10 and pass through slots 25 formed in a gib 26 which is arranged at the inner side of the flange 20 and interposed between the retaining strip 22 and the body of the carriage 10. The gib 26 may be adjusted inwardly by means of a plurality of screws 27, or their equivalents, to compensate for any wear which may arise in connection with the movement of the cross slide to be now referred to.

The numeral 28 designates the hereinbefore mentioned cross slide having at opposite sides of its base portion outstanding flanges 29 which fit beneath the retaining strips 21 and 22, the cross slide being thus held upon the carriage 10 but adapted to freely move in the guides formed beneath the retaining strips 21 and 22 and between the flanges 19 and 20. Extending lengthwise of the slide 28 is a bore 30 which receives an adjusting screw 31. At a point intermediate the ends of the bore 30 the latter is enlarged to provide a downwardly opening polygonal pocket or recess 32, which pocket or recess 32 receives a polygonal nut 33 the bore of which is screw-threaded to fit the threads of the adjusting screw 31. It will thus be apparent that the cross slide may be moved in either direction in the carriage 10 upon proper rotation of the screw 31. The forward end of the adjusting screw 31 is rotatably mounted within a head block or bracket 34 suitably bolted to the forward end of the carriage 10, and said adjusting screw is held against longitudinal movement in said block 34 through the medium of a fixed collar 35, which is carried by the screw 31 and arranged at the inner side of the block 34, and a hand wheel 36, of standard construction, which is arranged at the outer face of said block 34 and suitably secured to said screw 31. Thus, upon suitable operation of the hand wheel 36 the cross slide 28 is caused to traverse the carriage 10.

The upper portion of the cross slide 28 is enlarged to provide a dished receptacle or pan 37 for receiving the cuttings, but the forward end of said pan 37 is provided with a raised support 38 the surface of which is flattened, and surrounded by a plurality of guide strips 39 which are suitably secured to said support 38. A socket or pocket is thus provided at the support 38 for receiving a tool supporting block 40. The pocket formed by the guide strips 39 is substantially rectangular in form, and said tool-supporting block 40 is correspondingly shaped and of such dimensions as to snugly fit within the space between the guide strips 39. Thus it will be seen that when the tool-supporting blocks 40 are placed upon the support 38 and fitted between the guide strips 39, the same will be afforded a firm and stable mounting upon the cross slide 28.

The block 40 is provided with a plurality, preferably two, of tool-receiving openings 41 which extend lengthwise of the block 40, the bottom of each opening 41 being provided with a wear strip 42 suitably secured therein, and preferably case hardened to afford the greatest resistance to wear. Upon the wear strip 42 the tools 43 are mounted, as clearly illustrated in Fig. 4, each of said tools being properly held within the openings 41 by means of a plurality of set screws 44. If it be desired to raise the tools 43 above the wear strip 42 the same may be accomplished by the interposition of shims or spacing strips 45.

It is, of course, necessary that when the block 40 is placed upon the tool slide 28 the same shall be held in firm position on the support 38. This is accomplished by two instrumentalities, to wit; a centering pin 46 and an anchoring stud 47. The centering pin 46 enters a threaded opening 48 which is formed in the support 38 at the rear end thereof, said pin 46 being received by an opening 49 formed at the rear end of the block 40 and adapted to register with the opening 48. When this registration has been effected the centering pin 46 may be passed through the opening 49 and screwed into the opening 48, thus serving to hold the tool supporting block 40 in proper position within the space between the strips 39. The relation of the centering pin 46 is, obviously, a removable one with respect to the cross slide 28 in order to permit removal of the tool supporting block 40 when such is desired. The anchoring post 47 rises upwardly from the forward end of the support 38 and is screw threaded at its upper end for receiving a fastening nut 50. At the forward end of the block 40 is formed a U-shaped socket 51 which receives the anchoring post 47 when the block 40 is placed upon the cross slide 28. When so assembled the upper end of the anchoring post extends above the top of the tool supporting block 40, the diameter of the fastening nut 50 being sufficient to overlap the edges of the socket 51, thus permitting, when the fastening nut 50 is properly operated, a binding engagement between the fastening nut and the tool supporting block, and thereby locking the latter on the support 38.

In Figs. 2, 3 and 4 is illustrated the means for effecting horizontal adjustment of the several cutters 43, when greater nicety is required than can be obtained by movement of the cutters directly by hand. To provide for this a U-shaped supporting yoke 70 is arranged at the forward end of the tool-supporting block 40, the side arms of said yoke each being provided with an elongated slot 71, which is open at one of its ends, said slot receiving a fixed stud 72 which projects outwardly from the end of the block 40 adjacent to the arm, and each of said slots also receives a screw threaded stud or pin 73 having mounted thereon a clamping nut 74 which is adapted to embrace and bear against the outer side of each of the arms of the yoke. While the studs 72 will limit the movement of the yoke 70 towards the block 40 it is apparent that the outward movement, or movement away from the block, is limited only by the length of the slot 71, and when the proper positioning of the yoke with respect to the block 40 has been attained, the nuts 74 are tightened, thereby holding the yoke in such position of adjustment.

A plurality of guide pins 75 is mounted in the yoke 70, as by screw threading, the free ends of said pins being received by a plurality of sockets 76 formed in the block 40, said pins being capable of free movement within said sockets 76 so as to conform to the movement of the yoke 70 when the same is adjusted in relation to the block. Mounted in the yoke 70, one for each of the cutters 43, is a plurality of adjusting screws 77, the inner ends of which are provided with reduced necks 78 terminating in enlarged heads 79. The heads 79 fit within vertical channels 80 formed in the ends of the tools 43 which are contiguous to the screws 77, and each of said tools 43 is also provided with a vertically-disposed slot 81 which communicates with the channel 80 of the cutter, the shanks 78 of the screw 77 which engages the cutter being received by said slot 81. This slot is also provided with an enlarged opening 82 through which the head 79 is introduced to and removed from the channel 80. The manner of engagement of the screws 77 with their respective tools 43 is clearly illustrated in Fig. 4, and when so engaged it is obvious that as the screws 77 are adjusted the several tools 43 may be moved forwardly or rearwardly within the supporting block 40. It will, of course, be understood that this adjustment is effected only when the set screws 44 have been loosened, and when such adjustment has been made the screws 44 are again tightened to hold the tools in position.

It will thus be evident from the foregoing description that by means of this novel construction and arrangement of parts the cutting tools are properly supported with such rigidity as to withstand the heavy pressure to which they are subjected during the operation of roughening the axle and are maintained in their operative positions with the required stability which should characterize a tool holder subjected to these conditions of use.

We claim:

1. In a lathe tool holder, the combination with a cross slide provided with a fixedly positioned upright projection, of a tool holder associated with said slide and provided with a slot adapted to embrace said projection, the slotted portion of the holder abutting rigidly against the projection substantially in the horizontal plane of the cutting whereby the projection is caused to relieve the holder of torsional stresses otherwise resulting from its transmission to the slide of the horizontal stresses from the cutting.

2. In a lathe tool holder, the combination with a cross slide provided with a fixedly positioned upright projection, of a tool holder associated with said slide and provided with a slot adapted to embrace said projection, and means carried by said projection and acting on said holder to anchor the latter on the slide, the slotted portion of the holder abutting rigidly against the projection substantially in the horizontal plane of the cutting whereby the projection is caused to relieve the holder of torsional stresses otherwise resulting from its transmission to the slide of the horizontal stresses from the cutting.

3. In a lathe tool holder, the combination with a cross slide provided with a fixedly positioned upright projection, of a tool holder associated with said slide and provided with a slot adapted to embrace said projection, and adjustable means carried by said projection and acting on said holder to anchor the latter on the slide, the slotted portion of the holder abutting rigidly against the projection substantially in the horizontal plane of the cutting whereby the projection is caused to relieve the holder of torsional stresses otherwise resulting from its transmission to the slide of the horizontal stresses from the cutting.

4. In a lathe tool holder, the combination with a cross slide provided with a fixedly positioned upright projection, of a tool holder associated with said slide and provided with a slot adapted to embrace said projection, and means carried by said projection and acting downwardly on said holder to anchor the latter on the slide, the slotted portion of the holder abutting rigidly against the projection substantially in the horizontal plane of the cutting whereby the projection is caused to relieve the holder of torsional stresses otherwise resulting from its transmission to the slide of the horizontal stresses from the cutting.

5. In a lathe tool holder, the combination with a cross slide provided with an upright projection, of a tool holder associated with said slide and provided with a slot adapted to embrace said projection, and means for centering the said holder on the slide comprising a bolt adapted to pass through an aperture in the former and engage within a screw threaded aperture in the latter.

6. In a lathe tool holder, the combination with a cross slide provided with an upright projection, of a tool holder associated with said slide and provided with a slot adapted to embrace said projection, means carried by said projection and acting on said holder to anchor the latter on the slide, and means for centering said holder on the slide comprising a bolt adapted to pass through an aperture in the former and engage within a screw threaded aperture in the latter.

7. In a lathe tool holder, the combination with the holder proper, and the tools carried thereby, of a U-shaped supporting yoke associated with said holder proper, and means carried by said yoke and connected to said tools for effecting horizontal adjustment thereof.

8. In a lathe tool holder, the combination with the holder proper, and the tools associated therewith, of a supporting yoke associated with said holder proper, means for adjustably connecting said yoke to said holder proper, means for guiding the yoke in relation to said holder proper when adjusting the same, and means carried by said yoke and connected to said tools for effecting horizontal adjustment thereof.

9. In a lathe tool holder, the combination with the holder proper, and the tools associated therewith, of a bracket carried by said holder proper and disposed to the rear of the tools, and means carried by said bracket for effecting horizontal adjustment of said tools.

10. In a lathe tool holder, the combination with the holder proper, and the tools associated therewith, of a bracket carried by said holder proper and disposed to the rear and in the plane of the tools, and means carried by said bracket for effecting horizontal adjustment of said tools.

11. In a lathe tool holder, the combination with the holder proper, and the tools associated therewith, of a U-shaped supporting yoke connected at its ends to said holder proper, and means carried by said yoke intermediate its ends for effecting horizontal adjustment of said tools.

12. In a lathe tool holder, the combination with the holder proper, and the tools associated therewith, of a U-shaped supporting yoke detachably connected at its ends to said holder proper, and means carried by said yoke intermediate its ends for effecting horizontal adjustment of said tools.

In testimony whereof we have hereunto signed our names in the presence of two subscribing witnesses.

LE ROY KRAMER.

Witnesses for Kramer:
W. E. BORNHOFT,
M. L. DANNELLS.

ALEXANDER BOOME.

Witnesses for Boome:
ROBERT W. FERNALD,
H. F. SEIDLER.